(12) United States Patent
Genster et al.

(10) Patent No.: US 6,202,602 B1
(45) Date of Patent: Mar. 20, 2001

(54) COOLER FOR USE IN A VEHICLE COMBUSTION ENGINE

(75) Inventors: Albert Genster, Marl; Hansjürgen Kech, Herdecke; Horst-Georg Schmalfuss, Meinerzhagen; Gerhard Hunnekuhl, Witten, all of (DE)

(73) Assignee: Pierburg Aktiengesellschaft, Neuss (DE)

( * ) Notice: Subject to any disclaimer, the term of this patent is extended or adjusted under 35 U.S.C. 154(b) by 0 days.

(21) Appl. No.: 09/297,813

(22) PCT Filed: Jul. 31, 1997

(86) PCT No.: PCT/EP97/04643

§ 371 Date: May 4, 1999

§ 102(e) Date: May 4, 1999

(87) PCT Pub. No.: WO99/06232

PCT Pub. Date: Feb. 11, 1999

(51) Int. Cl.⁷ ................. F01P 5/10; F01P 11/00; F01P 7/02; F01P 11/02; F24H 3/02

(52) U.S. Cl. .............. 123/41.44; 123/41.14; 123/41.12; 123/41.55; 123/41.46; 165/10; 165/120

(58) Field of Search .............. 165/10, 902, 120, 165/DIG. 228; 123/41.14, 142.5 R, 41.44, 41.46, 41.55, 41.12

(56) References Cited

U.S. PATENT DOCUMENTS

| | | | | |
|---|---|---|---|---|
| 1,114,588 | * | 10/1914 | Dalman | 123/41.51 |
| 3,853,270 | * | 12/1974 | Prebil | 123/41.14 |
| 4,414,932 | * | 11/1983 | Lindberg | 123/142.5 R |
| 5,012,768 | * | 5/1991 | Roschinski | 123/41.14 |
| 5,372,098 | * | 12/1994 | Borsboom et al. | 123/41.44 |
| 5,806,479 | * | 9/1998 | Bauer et al. | 123/142.5 R |

FOREIGN PATENT DOCUMENTS

| | | | |
|---|---|---|---|
| 3023494 | * | 1/1982 | (DE) ... 164/10 A |
| 39 18 941 A1 | | 2/1990 | (DE) . |
| 41 00 193 A1 | | 7/1992 | (DE) . |
| 0791772 | * | 8/1997 | (DE) . |
| 0584850 | * | 3/1994 | (JP) . |

* cited by examiner

*Primary Examiner*—Ira S. Lazarus
*Assistant Examiner*—Tho Duong
(74) *Attorney, Agent, or Firm*—Herbert Dubno

(57) ABSTRACT

A cooler for the water circulation system of a combustion engine has a motor driven pump mounted directly on the cooler and connected via a flat surface with a plate provided with a three-way valve. The flat surface has an inlet and outlet connected to the plate.

1 Claim, 2 Drawing Sheets

COOLER FOR USE IN A VEHICLE COMBUSTION ENGINE

CROSS REFERENCE TO RELATED APPLICATIONS

This application is a national stage of PCT/EP 97/04643 filed Jul. 31, 1997.

SPECIFICATION

Field of the Invention

It is known to arrange in the cooling-media circuit of a combustion engine a cooler, as well as a latent heat storage system. The cooling medium is circulated via a pump and in the engine space of the motor vehicle the motor, the cooler and the latent heat storage system, as well as the pump of the cooling-medium circuit, constitute separate units which are mounted in the engine space one after the other.

OBJECT OF THE INVENTION

It is the object of the invention to simplify the production, assembly and repair, particularly the replacement of the units of a cooling-medium circuit and to make them more cost-effective, simultaneously reducing the space requirements.

SUMMARY OF THE INVENTION

This object is attained according to the invention in that a latent heat storage system and/or a motor pump are fastened on the cooler and connected in the cooling-water circuit. Thereby the cooler together with the latent heat storage system and/or the motor pump circulating the cooling medium form a structural unit, which considerably simplifies the production and assembly. Repairs are also facilitated and considerably less room is required in the engine space.

It is particularly advantageous when the latent heat storage system and/or the pump is/are arranged along the upper, lower and/or frontal side of the cooler. It is also advantageous for space saving when the pump is coaxially fastened to one frontal side of the latent heat storage system.

It is particularly advantageous when, on the side of the pump housing facing away from the electric motor, there is a flat connection surface with an inlet and an outlet, by means of which the pump can be fastened to the cooler and/or the latent heat storage system. Thereby between the connection surface and the pump and/or the cooler a plate can be fastened which has a hydraulic distributor and/or a valve (particularly a three-way valve).

A particularly advantageous application of a pump is given when the pump is a pipe pump, whose rotor is coaxially traversed by the flow. Also the electric motor of the pump can have a magnetic rotor, whereby the pump requires very little space and can be affixed by means of a plate to the adjacent aggregate.

A further integration and space reduction is achieved when on a frontal side of the pump and/or of the latent heat storage system a housing is mounted which contains electronic components for adjustment.

BRIEF DESCRIPTION OF THE DRAWING

The invention will be described in greater detail with reference to the accompanying drawing in which.

SPECIFIC DESCRIPTION

Figure 1:
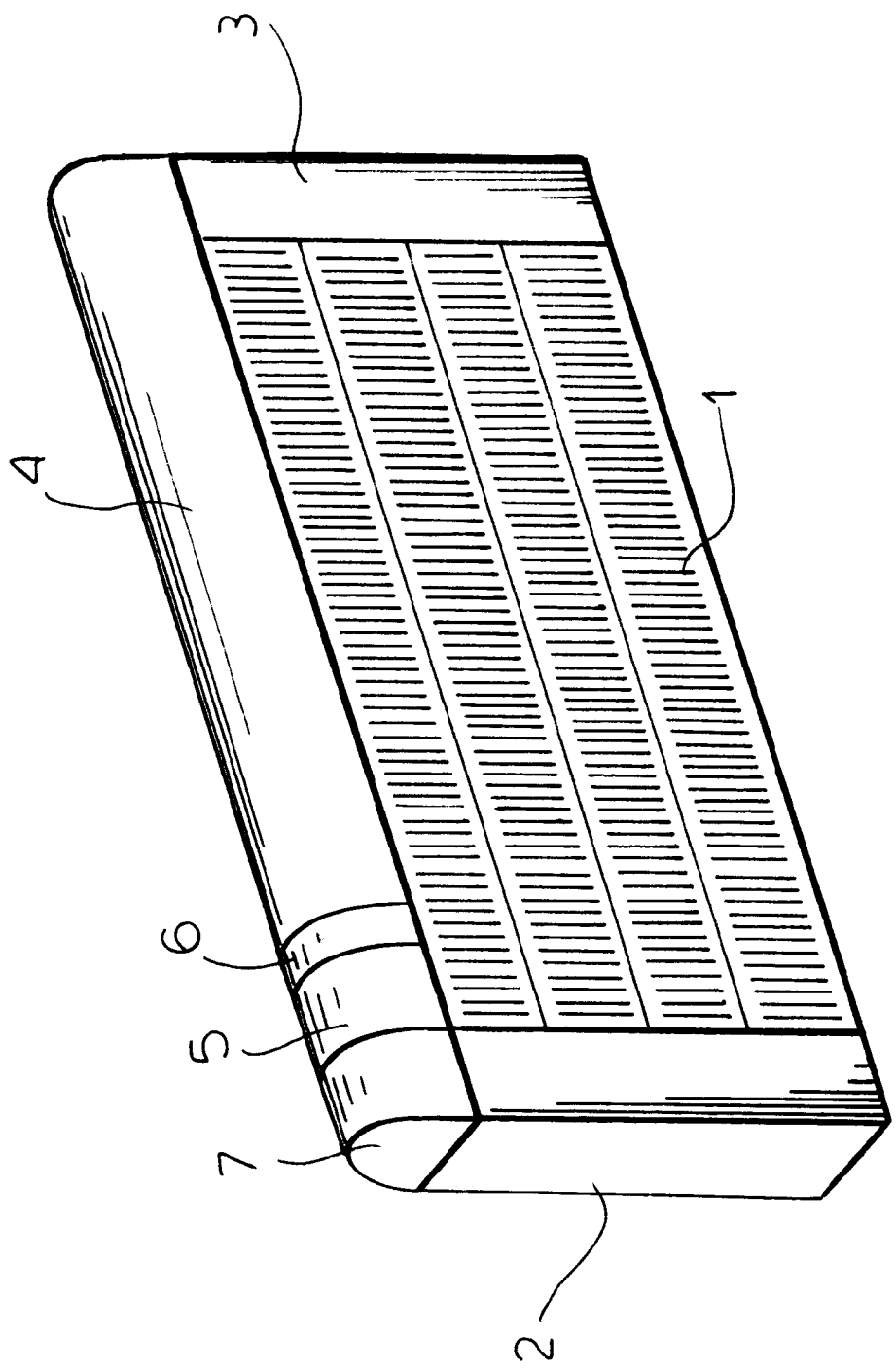
FIG. 1 is a perspective view of a cooler assembly for an automotive vehicle according to the invention.
Figure 2:
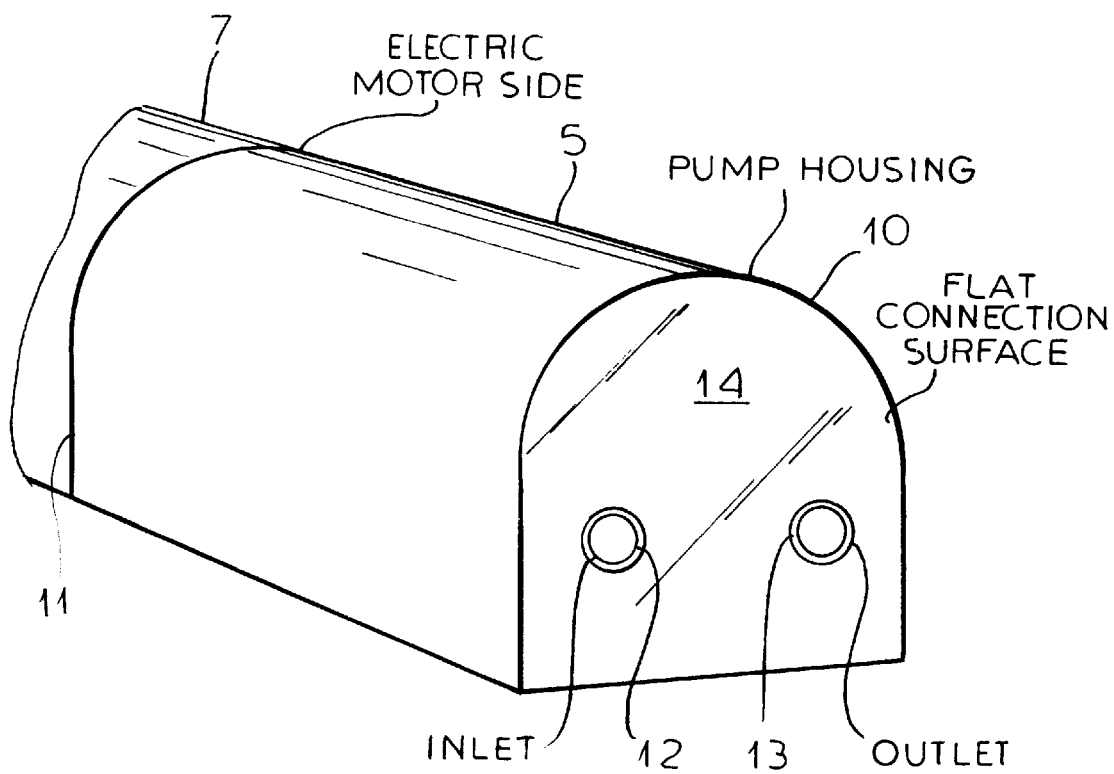
FIG. 2 is a perspective view of the motor pump thereof.
Figure 3:
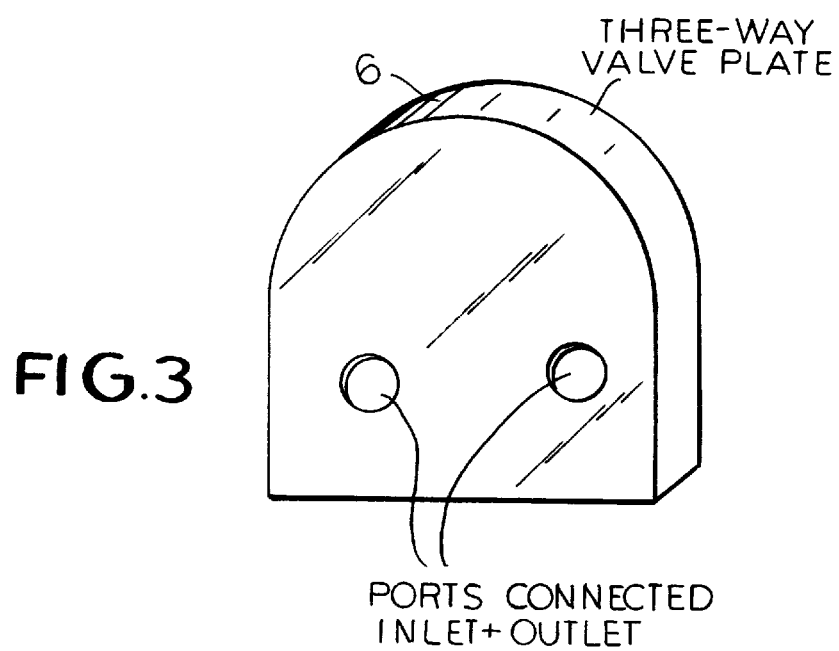
FIG. 3 is a perspective view of the three way valve blade connected between the pump housing and the cooler.

A cooler 1 connected in the cooling-water circuit of the combustion engine of a motor vehicle, whose height is smaller than its width has on each side a collector, whereby the first collector 2 forms the incoming tank of the cooler and the second collector 3 forms its recirculation tank. On the upper side of the cooler 1, several units are fastened, which cover the entire length of the cooler and of the two collectors. These can be various aggregates, such as a latent heat storage system 4 and/or a motor pump 5. Cooler 1, storage 4 and pump 5 are thereby connected to the same cooling-medium circuit of the motor vehicle engine. The cooler 1, the latent heat storage system 4 and the pump 5 form a structural unit, which within this constructional unit are connected in such a manner that they are traversed by the cooling medium.

The motor pump 5 is either a pipe pump or a canned motor pump, whose pump housing 10 has on its side facing away from the electric motor 11 a flat connection surface 14 with an inlet 12 and an outlet 13. With this connection side the pump is fastened to the cooler and/or the latent heat storage system.

Between the motor pump 5 and the latent heat storage system 4 or on the side facing away from the latent heat storage, the motor pump can be provided with s disk-shaped hydraulic distributor and/or a valve, particularly a three-way valve 6, which is controlled particularly by an electronic device 7. The device 7 is located inside a housing which contains the electronic adjustment elements and which is fastened to the frontal side of the motor pump and/or the latent heat storage system.

In further alternatives the motor of the motor pump 5 can have a magnetic rotor, whereby the motor pump has particularly small axial length. Further the motor pump can also be fastened to the other frontal side of the latent heat storage system 4.

In further alternatives, not represented here, the latent heat storage 4 and/or the motor pump 5, and possibly also the components 6 and 7, are not fastened to the upper side of the cooler 1, but to its underside, to one or both frontal sides and/or the front or the rear of cooler 1.

What is claimed is:

1. A cooling assembly for an engine of an automotive vehicle, comprising:

a cooler connected in a cooling-water circuit of a combustion engine of an automotive vehicle;

a motor pump mounted on a side of said cooler for circulating water in said circuit and said cooler, said pump having an electric motor and, at a side facing away from said electric motor, a flat connection surface formed with an inlet and an outlet; and a plate formed with a three-way valve fixed to said connection surface and between said connection surface and said cooler.

* * * * *